(12) United States Patent
Chang et al.

(10) Patent No.: US 7,749,460 B2
(45) Date of Patent: Jul. 6, 2010

(54) APPARATUS FOR MANUFACTURING CARBON NANOTUBES

(75) Inventors: Ching-Chou Chang, Tu-Cheng (TW); Bor-Yuan Hsiao, Tu-Cheng (TW); Chi-Chuang Ho, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 364 days.

(21) Appl. No.: 11/309,322

(22) Filed: Jul. 26, 2006

(65) Prior Publication Data

US 2007/0144887 A1 Jun. 28, 2007

(30) Foreign Application Priority Data

Oct. 28, 2005 (CN) .......................... 2005 1 0100799

(51) Int. Cl.
*B01J 19/12* (2006.01)
(52) U.S. Cl. ...................................... 422/186; 118/715
(58) Field of Classification Search .............. 423/447.3, 423/460; 422/186; 118/715
See application file for complete search history.

(56) References Cited

U.S. PATENT DOCUMENTS

| 5,569,455 | A | * | 10/1996 | Fukui et al. | ................. | 422/174 |
| 6,673,323 | B1 | * | 1/2004 | Bhatnagar et al. | ........... | 423/210 |
| 2001/0018894 | A1 | | 9/2001 | Chang et al. | | |
| 2005/0287297 | A1 | * | 12/2005 | Biris et al. | ............... | 427/248.1 |
| 2006/0078680 | A1 | * | 4/2006 | Nakano et al. | .......... | 427/249.1 |

* cited by examiner

*Primary Examiner*—Stuart Hendrickson
*Assistant Examiner*—Michelle Hou
(74) *Attorney, Agent, or Firm*—Jeffrey T. Knapp

(57) ABSTRACT

An apparatus for manufacturing carbon nanotubes includes: a reaction chamber having an inlet at a bottom and an opposite outlet at a top thereof, and a substrate region configured for accommodating a substrate for growing carbon nanotubes thereon; an electric field generating device configured for generating an electric field around the substrate region, the electric field being substantially perpendicular to the substrate; and a magnetic field generating device configured for generating a magnetic field around the substrate region, the magnetic field being substantially perpendicular to the substrate.

10 Claims, 2 Drawing Sheets

APPARATUS FOR MANUFACTURING CARBON NANOTUBES

TECHNICAL FIELD

The present invention relates to apparatus and methods for making carbon nanotubes and, particularly, to an apparatus and a method for making carbon nanotubes by chemical vapor deposition (CVD).

DESCRIPTION OF RELATED ART

Generally, carbon nanotubes can be manufactured by methods including resistance heating, arc discharge with a carbon rod as raw material, laser ablation, and chemical vapor deposition using acetylene gas.

Chemical vapor deposition (CVD) is a method of generating carbon nanotubes by a chemical decomposition reaction with a carbon-containing gas. The chemical vapor deposition depends on a chemical reaction occurring in the carbon-source gas as part of a thermal decomposition process, thereby enabling the manufacture of high-purity carbon nanotubes. A typical CVD apparatus includes a reaction chamber configured for accommodating a substrate, on which nanotubes can be grown. The reaction chamber has an inlet and a corresponding outlet. The substrate has a catalyst layer formed on a top surface thereof. During the growth of carbon nanotubes, a flow of carbon-containing gas is introduced into the reaction chamber, thereby bringing carbon atoms contained in the gas to the substrate.

However, carbon nanotubes formed by the above-mentioned apparatus have disorderly alignment which limits their application.

Therefore, what is needed in the art is to provide an apparatus for manufacturing vertically aligned carbon nanotubes.

SUMMARY OF THE INVENTION

In one aspect of the present invention, an apparatus for manufacturing carbon nanotubes is provided. The apparatus includes: a reaction chamber having an inlet at a bottom and an opposite outlet at a top thereof, and a substrate region configured for accommodating a substrate for growing carbon nanotubes thereon; an electric field generating device configured for generating an electric field around the substrate region, the electric field being substantially perpendicular to the substrate; and a magnetic field generating device configured for generating a magnetic field around the substrate region, the magnetic field being substantially perpendicular to the substrate.

In another aspect of the present invention, a method for manufacturing carbon nanotubes is provided. The method includes the steps of: providing a reaction chamber having an inlet at a bottom and an opposite outlet at a top thereof; placing a substrate with a catalyst layer formed thereon at a position inside the reaction chamber; generating an electric field around the substrate, the electric field being substantially perpendicular to the substrate; generating a magnetic field around the substrate, the magnetic field being substantially perpendicular to the substrate; introducing a carrier gas into the reaction chamber; heating the reaction chamber to a predetermined temperature; introducing a carbon-containing gas into the reaction chamber for growing carbon nanotubes from the catalyst layer.

Detailed features of the present carbon nanotubes manufacturing apparatus will become more apparent from the following detailed description and claims, and the accompanying drawings.

BRIEF DESCRIPTION OF THE DRAWINGS

Many aspects of the present apparatus and method can be better understood with reference to the following drawings. The components in the drawings are not necessarily drawn to scale, the emphasis instead being placed upon clearly illustrating the principles of the present apparatus and method. Moreover, in the drawings, like reference numerals designate corresponding parts throughout the several views.

DETAILED DESCRIPTION OF PREFERRED EMBODIMENTS

Reference will now be made to the drawings to describe the preferred embodiments of the present apparatus for manufacturing carbon nanotubes in detail.

Figure 1:
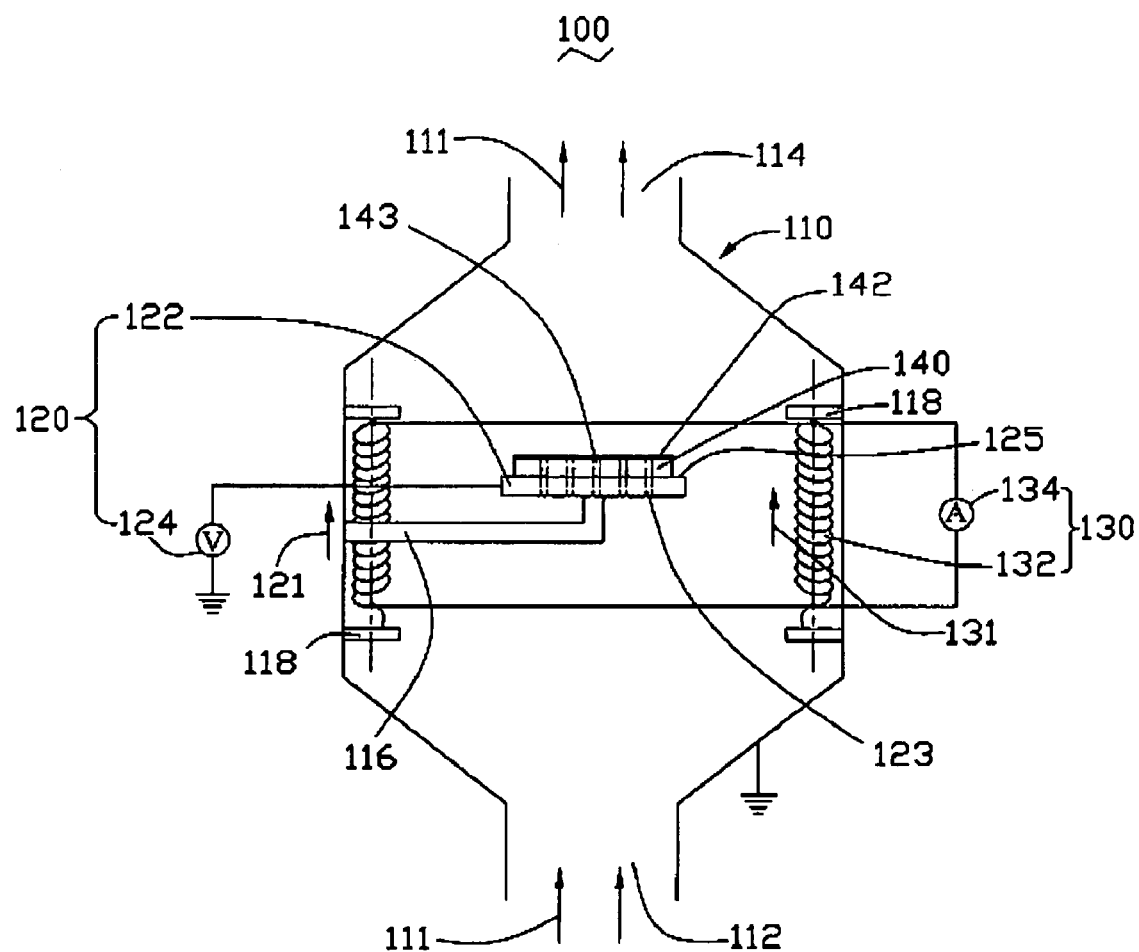
FIG. 1 is a schematic cross-sectional view of an apparatus for manufacturing carbon nanotubes according to a first exemplary embodiment.

Referring now particularly to FIG. 1, where an apparatus 100 for manufacturing carbon nanotubes is shown. The apparatus 100 includes a reaction chamber 110, an electric field generating device 120 and a magnetic field generating device 130.

The reaction chamber 110 is configured for accommodating a substrate 140 for growing carbon nanotubes thereon. The reaction chamber 110 has an inlet 112, an outlet 114, a holder 116 and a number of fixing members 118. The inlet 112 is defined at a bottom of the reaction chamber 110. The outlet 114 is defined at a top of the reaction chamber 110 opposite to the inlet 112. The inlet 112 and the outlet 114 cooperatively define a gas flow direction 111. The holder 116 has two end portions. One of the two end portions is fixed to an interior wall of the chamber 110 and the other is free for holding the electric field generating device 120. The fixing members 118 are disposed on the interior wall of the reaction chamber 110. The fixing members 118 are insulative and can be used for fixing the magnetic field generating device 130.

The electric field generating device 120 is configured for generating an electric field whose direction 121 is substantially perpendicular to the substrate 140. The electric field generating device 120 has an electrode 122 and a voltage source 124. The electrode 122 is a plate electrode that has a flat supporting surface 125 facing toward the outlet 114. The voltage source 124 is configured for applying a direct current bias to the electrode 122. The electrode 122 is held by the holder 116 with the electrode 122 being spaced apart from an inner wall of the reaction chamber 110. The gas flow direction 111 is perpendicular to the supporting surface 125 of the electrode 122. The substrate 140 is positioned on the supporting surface 125 of the electrode 122, with a surface of the substrate 140 facing toward the outlet 114. A catalyst layer 142 for growing carbon nanotubes is formed on the surface of the substrate 140. In this way, the direction 121 of the electric field is substantially perpendicular to the substrate 140, and the direction 121 of the electric field is also substantially perpendicular to the supporting surface 125 of the electrode 122 and substantially parallel to the gas flow direction 111. In the present embodiment, a number of through holes 143 are formed in the substrate 140, and a number of through holes 123 are formed in the electrode 122. The through holes 123 are in communication with the respective through holes 143. The through holes 123, 143 allow a carbon-containing gas to pass therethrough. In other words, central axes of the through holes 123, 143 are substantially parallel to the gas flow direction 111 and the direction 121 of the electric field.

The magnetic field generating device 130 is configured for generating a magnetic field whose direction 131 is substantially perpendicular to the substrate 140. The magnetic field generating device 130 has at least one coil 132 and a current source 134. In the illustrated exemplary embodiment, the magnetic field generating device 130 has two coils 132. The coils 132 are fixed to the fixing members 118 positioning them adjacent to the interior side wall of the reaction chamber 110. The current source 134 is configured for applying a current to the coils 132. The direction 131 of the magnetic field is substantially perpendicular to the supporting surface 125 of the electrode 122 and substantially parallel to the gas flow direction 111. Also, the direction 131 of the magnetic field is substantially parallel to the central axes of the through holes 123, 143.

Figure 2:
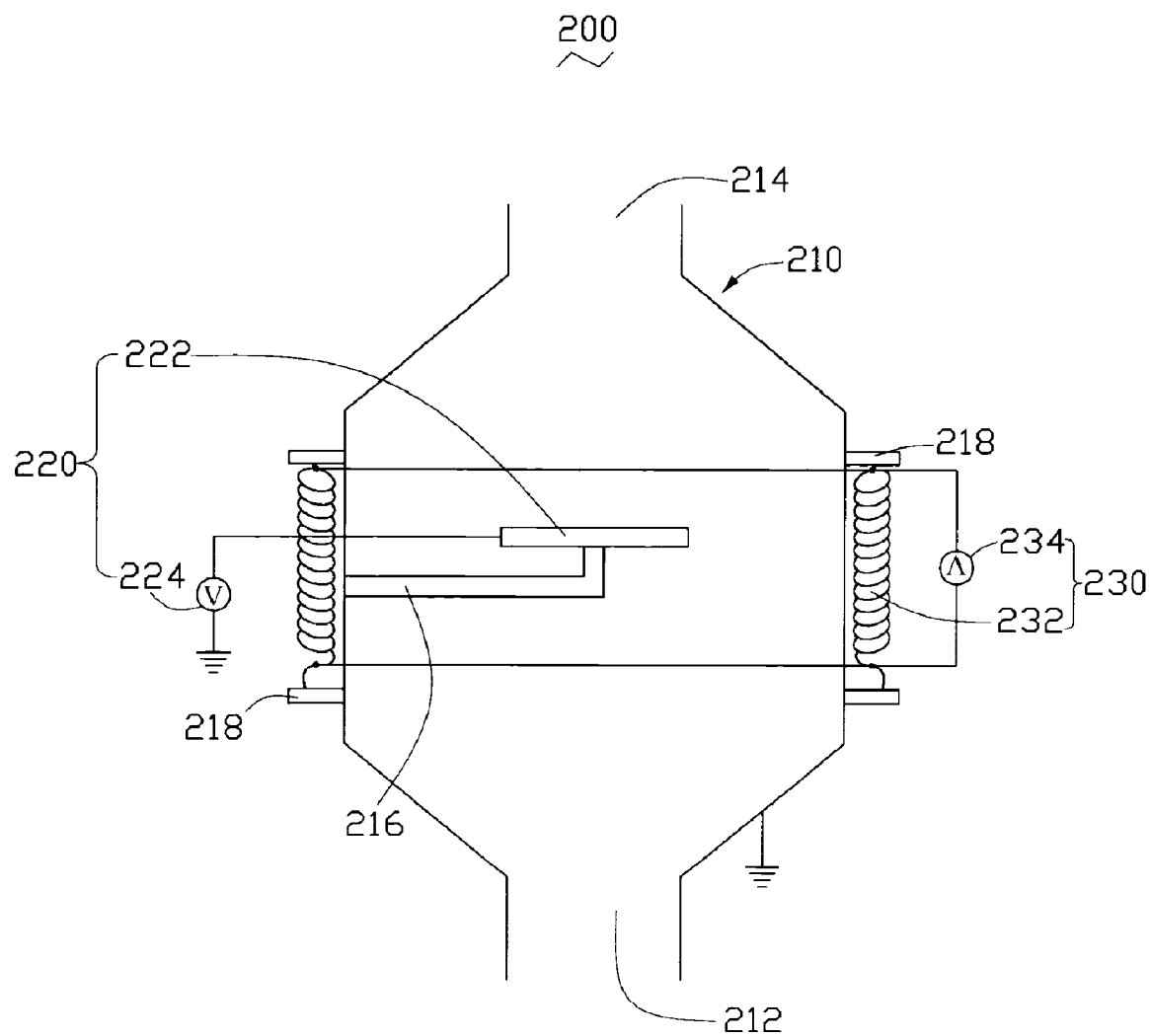
FIG. 2 is a schematic cross-sectional view of an apparatus for manufacturing carbon nanotubes according to a second exemplary embodiment.

Referring to FIG. 2, an apparatus 200 for manufacturing carbon nanotubes of a second exemplary embodiment is shown. The apparatus 200 of the second embodiment is similar to the apparatus 100 of the first embodiment. However, fixing members 218 are disposed on an exterior side wall of a reaction chamber 210, coils 232 are fixed to the fixing members 218 such that the coils 232 are adjacent to the exterior side wall of the reaction chamber 210, an electrode 222 does not have any through holes therein, and a substrate for supporting carbon nanotubes is omitted. An inlet 212, an outlet 214, voltage source 224 and a current source 234 are the same as the corresponding components illustrated in FIG. 1. In this embodiment, the electrode 122 can also work as a substrate for supporting carbon nanotubes grown thereon.

In another aspect of the present invention, a method for manufacturing carbon nanotubes using the above apparatus 100 of the first exemplary embodiment includes the steps in no particular order of:

(1) providing a reaction chamber 110 having an inlet 112 at a bottom and an opposite outlet 114 at a top thereof;

(2) placing a substrate 140 with a catalyst layer 142 formed thereon inside the reaction chamber 110;

(3) generating an electric field around the substrate 140, the electric field being substantially perpendicular to the substrate 140;

(4) generating an magnetic field around the substrate 140, the magnetic field being substantially perpendicular to the substrate 140;

(5) introducing a carrier gas into the reaction chamber 110;

(6) heating the reaction chamber 110 to a predetermined temperature;

(7) introducing a carbon-containing gas into the reaction chamber 110 for growing carbon nanotubes from the catalyst layer 142.

In step (1), the inlet 112 is defined at a bottom of the reaction chamber 110 and the outlet 114 is defined at a top of the reaction chamber 110 opposite to the inlet 112.

In step (2), the substrate 140 has a catalyst layer 142 formed thereon is disposed on the electrode 122. The substrate 140 is made of a material selected from a group consisting of quartz, silicon, and magnesium oxide. The material of the catalyst layer 142 is selected from a group consisting of cobalt, nickel, iron, and any appropriate alloy of them. Preferably, the electrode 122 has a plurality of through holes 123 and the substrate 140 has a plurality of corresponding through holes 143. Thereby, the carbon-containing gas will be guided through the holes 123 and 143 substantially perpendicular to the substrate 140. In other words, the inlet 112 and the outlet 114 cooperatively define a gas flow direction that is perpendicular to the electrode 122. Alternatively, the catalyst layer 142 may be formed on the electrode 122 instead of the substrate 140. Therefore, the electrode 122 works as a substrate, upon which nanotubes can be grown.

In step (3), the reaction chamber 110 is electrically connected to the earth and the reaction chamber 110 works as a corresponding electrode to the electrode 122. When the voltage source 124 applies a direct current bias to the electrode 122, there will be an electric field generated whose direction is substantially perpendicular to the substrate 140. Preferably, an electric field intensity of the electric field is in a range from 500 to 3000 kilovolts per meter.

In step (4), the magnetic field is generated by a magnetic field device 130. The magnetic device 130 comprises a coil 132 and a current source 134. When the current source 134 applies a current to the coil 132, the coil 132 will generate a magnetic field whose direction is substantially perpendicular to the substrate 140. Preferably, a magnetic field intensity of the magnetic field is in a range from 10-5~1 tesla.

In step (5), the carrier gas is introduced to the inlet 112. The carrier gas is selected from the group consisting of hydrogen gas, nitrogen gas, ammonia gas, and other similarly inert gases.

In step (6), the reaction chamber 110 is heated to a predetermined temperature by a heater, for example, a high temperature furnace or a high frequency induction heating furnace etc. Preferably, the predetermined temperature is in the range from 500° C. to 900° C.

In step (7), the carbon-containing gas is selected from a group consisting of methane, ethane, ethylene, acetylene and other similar carbon containing gases.

During the above-described process of manufacturing carbon nanotubes, the direction of the electric field and the direction of the magnetic field are both perpendicular to the substrate, and is thus greatly advantageous for the vertical growth of carbon nanotubes. So the apparatus provided in the exemplary embodiment can be used to manufacture carbon nanotubes with high vertical alignment.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for manufacturing carbon nanotubes, the apparatus comprising:
a reaction chamber having an inlet at a bottom and an opposite outlet at a top thereof, and a substrate growing carbon nanotubes thereon, the substrate being held by the reaction chamber and spaced apart from an inner wall of the reaction chamber;
an electric field generating device generating an electric field, the electric field generating device comprising a plate electrode entirely disposed inside the reaction chamber, the plate electrode having a flat supporting surface facing towards the outlet, the supporting surface supporting the substrate, a direction of the electric field being substantially perpendicular to the plate electrode; and a magnetic field generating device generating a magnetic field, a direction of the magnetic field being substantially perpendicular to the plate electrode, wherein the magnetic field generating device comprises a coil, and the coil is arranged in the interior of the reaction chamber.

2. The apparatus for manufacturing carbon nanotubes according to claim 1, wherein the electric field generating device further comprises a holder for holding the plate electrode.

3. The apparatus for manufacturing carbon nanotubes according to claim 1, wherein the electric field generating device comprises a voltage source for applying a direct current bias to the plate electrode.

4. The apparatus for manufacturing carbon nanotubes according to claim 1, wherein the magnetic field generating device further comprises a current source for applying a current to the coil.

5. The apparatus for manufacturing carbon nanotubes according to claim 1, wherein the inlet and the outlet cooperatively define a gas flow direction that is perpendicular to the plate electrode.

6. The apparatus for manufacturing carbon nanotubes according to claim 1, wherein the plate electrode defines a plurality of through holes for a carbon-containing gas to pass therethrough.

7. An apparatus for manufacturing carbon nanotubes, the apparatus comprising:
- a reaction chamber having an inlet at a bottom and an opposite outlet at a top thereof, the inlet and the outlet cooperatively defining a gas flow direction;
- an electric field generating device generating an electric field and comprising a plate electrode having a flat surface and a voltage source applying a direct current bias to the plate electrode;
- a substrate growing carbon nanotubes thereon, the substrate being held by the reaction chamber, spaced apart from an inner wall of the reaction chamber, and disposed on the flat surface of the plate electrode with a surface of the substrate facing towards the outlet; and
- a magnetic field generating device generating a magnetic field;

wherein the direction of the electric field and the direction of the magnetic field are substantially parallel to the gas flow direction, the magnetic field generating device comprises a coil and a current source for applying a current to the coil, and the coil is arranged in the interior of the reaction chamber.

8. The apparatus for manufacturing carbon nanotubes according to claim 7, wherein the plate electrode defines a plurality of through holes for a carbon-containing gas to pass therethrough.

9. The apparatus for manufacturing carbon nanotubes according to claim 8, wherein the substrate defines a plurality of through holes communicating with the through holes in the plate electrode.

10. An apparatus for manufacturing carbon nanotubes, the apparatus comprising:
- a reaction chamber having an inlet at a bottom and an opposite outlet at a top thereof;
- an electric field generating device comprising a plate electrode having a flat surface and a voltage source applying a direct current bias to the plate electrode;
- a substrate growing carbon nanotubes thereon, the substrate having a first surface and a second surface on opposite sides thereof, the substrate being held by the reaction chamber, spaced apart from an inner wall of the reaction chamber, and disposed on the flat surface of the plate electrode with the first surface facing toward the outlet; and
- a magnetic field generating device generating a magnetic field with a direction thereof being substantially perpendicular to the plate electrode;

wherein the plate electrode defines a plurality of through holes for a carbon-containing gas to pass therethrough, the substrate defines a plurality of through holes extending through the first surface and the second surface thereof and communicating with the through holes of the plate electrode, the magnetic field generating device comprises a coil and a current source applying a current to the coil, and the coil is arranged in the interior of the reaction chamber.

* * * * *